UNITED STATES PATENT OFFICE.

RALPH McKENZIE, OF JERSEY CITY, NEW JERSEY.

PROCESS OF PRODUCING LAKES OR COLORING COMPOUNDS BY ELECTROLYSIS.

SPECIFICATION forming part of Letters Patent No. 554,718, dated February 18, 1896.

Application filed February 21, 1895. Serial No. 539,202. (No specimens.)

*To all whom it may concern:*

Be it known that I, RALPH MCKENZIE, a citizen of the United States, residing at Jersey City, in the county of Hudson and State of New Jersey, have invented certain new and useful Improvements in Producing Coloring Compounds; and I do hereby declare the following to be a full, clear, and exact description of the invention, such as will enable others skilled in the art to which it appertains to make and use the same.

This invention relates to the production of lakes or organic and inorganic coloring compounds insoluble in water.

The primary object of the invention is to produce insoluble coloring materials or lakes by electrolysis.

Further, the object of the invention is to produce different varieties, shades or grades of insoluble coloring compounds by the use of the various oxidizable metals, or their alloys, as anodes of the electric circuit employed.

The invention consists primarily in the production of fast, mordanted, and insoluble coloring materials, by placing in suitable liquids the fundamental bases of coloring-matter and then in subjecting the solution or mixture to a current of electricity, applied by means of electrodes of suitable oxidizable metals maintained in contact with the liquid.

In producing, according to my invention, coloring materials for use in printing fabrics and wall-papers, and for oil and water pigments and paints, I proceed as follows: I first dissolve or place in suspension in a finely-divided condition, in the fluid employed, the fundamental bases of coloring-matters, whether organic or inorganic, such as chromic acid, alizarine or cochineal. The solution or mixture is then subjected to a constant current of electricity, the current being applied by means of electrodes of aluminum, tin, or other suitable oxidizable metal or their alloys, according to the color desired, the anode being maintained in contact with the solution or mixture. The result of the electrolytic action is a formation in the menstruum of insoluble color compounds or lakes which may be filtered off or removed by decantation of the liquid. The compounds are then dried and powdered for use.

In producing coloring-matters by this process it is preferable and more economical to utilize a constant electric current of about ten volts. The electrodes should be placed near enough together in the menstruum and should have sufficient active surface exposed to cause as great a quantity of electric current to pass through the electrolyte without unnecessarily producing high temperatures, thus diminishing to the minimum the electromotive force required.

As an illustration of the operation of my process I will describe the production of a mordanted lake of a brilliant red color from aniline. With this in view I proceed as follows: I place in water a suitable quantity of aniline, and also place in contact with the water two electrodes, the anodes being composed of aluminum. By passing a current of electricity through the menstruum I produce a coagulated compound of insoluble hydrated aluminum and aniline. The precipitate produced is removed by filtration or decantation, and after drying and powdering is ready for use.

Having thus described my invention, what I claim as new, and desire to secure by Letters Patent, is—

The method of producing lakes or insoluble pigments or paints which consists in placing in suitable liquid the fundamental bases of coloring-matters, then subjecting the solution or mixture to a current of electricity applied by means of electrodes retained in contact with the liquid, the anode being composed of oxidizable metal and then separating the lakes or pigments from the menstruum, substantially as described.

In testimony whereof I affix my signature in presence of two witnesses.

RALPH McKENZIE.

Witnesses:
 ORAZIO LUGO,
 FRED D. LINN.